(12) United States Patent
Mayr

(10) Patent No.: US 6,578,693 B2
(45) Date of Patent: Jun. 17, 2003

(54) AXIAL SETTING DEVICE

(75) Inventor: Nikolaus Mayr, Bruneck-Reischach (IT)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 09/826,688

(22) Filed: Apr. 5, 2001

(65) Prior Publication Data

US 2001/0047919 A1 Dec. 6, 2001

(30) Foreign Application Priority Data

Apr. 7, 2000 (IT) ......................... MI20A0749
Jul. 10, 2000 (DE) ......................... 100 33 482

(51) Int. Cl.$^7$ ............................................. F16H 25/08
(52) U.S. Cl. ................. 192/226; 192/70.24; 192/84.91; 192/84.6; 192/93 A
(58) Field of Search .................. 192/70.2, 226, 192/84.91, 70.23, 70.24, 93 A, 84.6, 101

(56) References Cited

U.S. PATENT DOCUMENTS

| | | | |
|---|---|---|---|
| 3,791,501 A | * 2/1974 | Culbertson | 192/93 A |
| 4,950,214 A | * 8/1990 | Botterill | 475/231 |
| 5,160,004 A | * 11/1992 | Scott et al. | 192/17 R |
| 5,279,401 A | * 1/1994 | Stall | 192/52.4 |
| 5,464,084 A | * 11/1995 | Aoki et al. | 192/35 |
| 5,484,033 A | * 1/1996 | Frank et al. | 180/245 |

FOREIGN PATENT DOCUMENTS

| | | | |
|---|---|---|---|
| JP | 61-294219 A | * | 12/1986 |
| JP | 61-294220 A | * | 12/1986 |

* cited by examiner

*Primary Examiner*—Saúl Rodriguez

(57) ABSTRACT

An axial setting device in a housing, especially for actuating a multi-plate coupling whose friction plates are alternately connected in a rotationally fast and axially displaceable way to the one and the other respectively of two parts rotatable relative to one another, which rest against an axially fixed supporting disc and which can be loaded by an axially displaceable pressure disc, comprising a setting disc which is rotatably supported in the housing, which is mounted so as to be axially fixed in the housing and which is rotatingly drivable, a pressure disc which is held in the housing, which is held in a rotationally fast way by anti-rotation means arranged in the housing and which is axially displaceable in the housing, ball groove configurations in the surfaces of the setting disc and of the pressure disc, which surfaces face one another, which ball groove configurations extend in the circumferential direction, have oppositely directed gradients across the circumference and are associated with one another in pairs, so as to jointly accommodate a ball, and rotary driving means for the setting disc mounted in the housing, wherein the anti-rotation means are designed so as to be releasable from the pressure disc.

26 Claims, 2 Drawing Sheets

AXIAL SETTING DEVICE

BACKGROUND OF THE INVENTION

The invention relates to an axial setting device in a housing, especially for actuating a multi-plate coupling whose friction plates are alternately connected in a rotationally fast and axially displaceable way to the one and the other respectively of two parts rotatable relative to one another, which rest against an axially fixed supporting disc and which can be loaded in one embodiment by an axially displaceable pressure disc, comprising a setting disc which is rotatably supported in the housing, which is mounted so as to be axially supported in the housing, which is mounted so as to be axially fixed in the housing and which is rotatingly drivable, a pressure disc which is held in the housing, which is held in a rotationally fast way by anti-rotation means arranged in the housing and which is axially displaceable in the housing, or which can be loaded—in another embodiment—by an axially displaceable setting disc, comprising a setting disc which is rotatably supported in the housing, which is mounted so as to be axially displaceable in the housing and which is rotatingly drivable, a pressure disc which is held in the housing, which is held in a rotationally fast way by anti-rotation means arranged in the housing and which is axially fixed in the housing, ball groove configurations in the surfaces of the setting disc and of the pressure disc, which surfaces face one another, which ball groove configurations extends in the circumferential direction, have oppositely directed gradients and are associated with one another in pairs, so as to jointly accommodate a ball and rotary driving means for the setting disc mounted in the housing.

Setting devices of said type combined with the above-mentioned multi-plate coupling are known in different designs and for different applications.

DE 38 15 225 C2 describes such a device which is integrated into a bevel gear differential drive. The setting disc is directly driven by a conical pinion which engages a bevel gear toothing at the setting disc.

From DE 40 07 506 C1, there is known a device of said type which is used in a manual gearbox. The driving means for the setting disc comprise the same parts as mentioned above, but in addition, they comprise a spur gear reduction drive.

DE 41 06 503 C1 refers to a further development of the latter application. It shows the anti-rotation means for the pressure disc which consist of a tongue-and-groove assembly, with the tongue being connected to the fixed part of the housing and the groove constituting an individual notch at the pressure disc.

EP 0 368 140 B1 describes different applications for setting devices of said type, and inter alia, it can be seen that at its circumference, the setting disc can comprise a worm toothing or helical toothing and setting can be effected by means of a worm driven by a motor and positioned on the motor shaft.

In the case of the devises mentioned first, the driving motor for the setting disc has to be kept under voltage for as long as a positive setting force is to be maintained. This means that the capacity of the motor has to be higher or that the motor requires an additional braking device. The latter device can only be equipped with non-self-inhibiting rotary drive means because the device has to feature as little friction as possible. Irrespective of the latter, in the case of failure involving a voltage brake-down, a reverse motion of the device effected by returning forces is almost impossible due to the high friction in the rotary drive means provided in the form of a worm drive. In a case of failure involving voltage brake-down, a multi-plate coupling closed by rotating the setting disc relative to the pressure disc would be released by the rotary drive means only hesitatingly.

SUMMARY OF THE INVENTION

It is the object of the present invention to improve a device of the latter type in that a rapid return from an assumed set position of the device can be effected by simple means in the sense of reducing the setting path. The objective is achieved in that anti-rotation means are designed so as to be releasable from the pressure disc.

The conventional mode of operation is such that, normally, the setting path of the axial setting device is increased or reduced by actuating the rotary drive means which act on the rotatingly drivable setting disc which, via the balls, acts on/is supported on the pressure disc held in a rotationally fast way, with the oppositely directed gradients determining the setting path as a result of the relative rotation of the setting disc relative to the pressure disc. In addition, the special mode of operation in accordance with the invention consists in that, in the case of failure or for special operating conditions, a rapid reduction of the setting path is effected independently of an actuation of the rotary drive means in that the pressure disc is released for rotation purposes so that the counter forces acting on the pressure disc/setting disc act as returning forces which are reduced because the pressure disc is able to rotate freely relative to the setting disc which is held by the rotary drive means in a rotationally fast way or is driven only slowly thereby, with the direction of rotation being determined so as to be opposite to the direction of the oppositely directed gradients of the ball groove configurations. As a result, the setting path of the setting device is very quickly revered automatically.

Releasing the anti-rotation means can constitute a safety measure and can be effected in a case of failure, for instance when there occurs a voltage brake-down. However, it is also possible to provide embodiments wherein the anti-rotation means can be released from the pressure disc for certain operating conditions and can, optionally, also be controlled positively.

In a preferred embodiment, the anti-rotation means can be designed in such a way that they comprise an axially displaceable pin which is aligned relative to the pressure disc, which, in a first position, can engage notches in the circumference of the pressure disc and which, in a second position, is able to move radially out of the notches. The pin must be able to slide in the notches in the direction of displacement of the pressure disc. In particular, the anti-rotation means can comprise an electromagnet which acts on the pin in its holding position, and said holding position can be spring-supported. According to a particularly advantageous embodiment it is proposed that, at the circumference of the pressure disc, the free end of the pin and the flanks of the notches form angles with the radial line which are greater than the self-inhibition angle, so that if the electromagnet is de-energised, with returning forces acting on the pressure disc/setting disc, the pin is suppressed automatically out of his position of engagement in one of the notches. To generate such returning forces, it is proposed in particular that a pretension pressure spring, especially a plate spring, axially acts on the pressure disc towards the setting disc/on the setting disc towards the pressure disc.

It is possible for the anti-rotation means to have any other design; in particular, the form-fitting engagement can be replaced by a friction-locking engagement, i.e. it is possible to provide any type of braking device. In addition, the anti-rotation means, instead of being set electromagnetically, can also be set hydraulically, pneumatically or in any other way.

As far as the design of the rotary drive means are concerned, it is proposed according to a preferred embodiment that, at the outer circumference of the setting disc, there is provided a worm toothing or helical toothing and that there is provided a setting motor on whose shaft, there is positioned a worm which engages the worm toothing or helical toothing. In particular, it is proposed that the worm drive consisting of the setting disc and the worm is self-inhibiting.

Because of the large transmission ratios of worm drives, the driving forces to be proved by the setting motor are low. There is no need for a reduction gear. To be able to stop the setting disc while it is in a rotating position when the setting motor is de-energized, the worm gear is designed so as to be self-inhibiting.

In another embodiment there is provided that at the outer circumference of the setting disc there is provided spur gear toothing and there is provided a setting motor on which shaft there is positioned a spur gear pinion.

A return motion of the setting device as a result of returning forces acting on the pressure disc/setting disc cannot take place. Nevertheless, each position as set can be released without delay by disconnecting the anti-rotation means from the pressure disc. The ball groove configurations between the setting disc and the pressure disc cause the pressure disc to be turned back in the sense of the pressure disc approaching the setting disc/the setting disc approaching the pressure disc.

There is thus provided a setting device wherein, due to a high transmission ratio in the worm device, the setting process can be effected by low driving forces, and because of the self-inhibiting nature of the worm drive, a set rotational position of the setting disc can be maintained permanently when the setting motor is de-energised. Finally, the pressure disc is able to return freely from any positive position as set, in spite of the setting disc being in a fixed position.

It is also possible to use other drive concepts for the rotary drive of the setting disc, such as crown gear drives, spur gear drives, chain drives, belt drives, cog belt drives, etc. In an embodiment, wherein he setting device is driven by a spur gear drive, the driven setting disc is able to return freely by axial motion in the gears ins spite of the setting disc being held rotationally fixed by the drive.

BRIEF DESCRIPTION OF THE DRAWINGS

Preferred embodiments of the invention are diagrammatically illustrated in the drawing wherein.

DETAILED DESCRIPTION OF THE PREFERRED EMBODIMENTS

Figure 1:
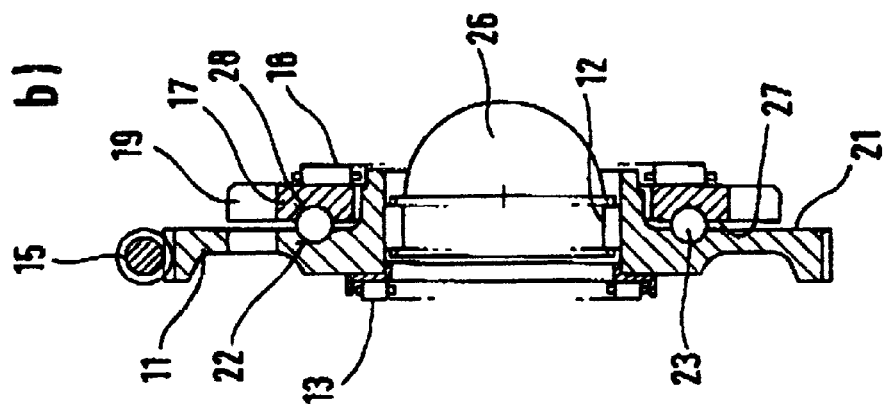
FIG. 1 shows an inventive setting assembly in the form of a detail, (a) in an axial view of the pressure disc, (b) in an axial section.
Figure 1:
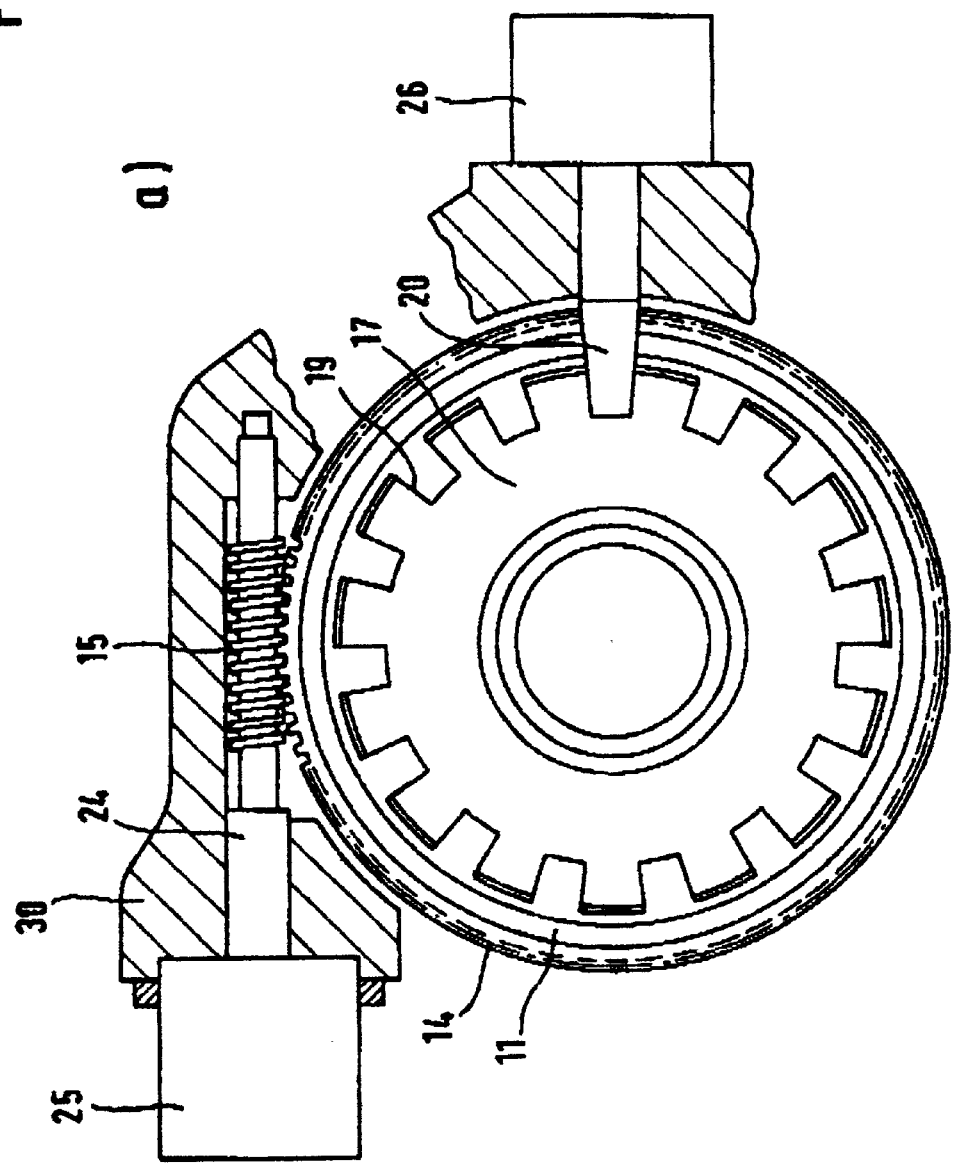

FIG. 1 does not show the shaft on which the assembly is supported in the housing, but it shows the bearing means for the shaft. FIGS. 1a and 1b will be described jointly.

FIG. 1 shows a setting disc 11 with a radial bearing 12 for supporting the setting disc 11 on said shaft (not illustrated) and an axial bearing 13 for providing axial support relative to the shaft. The setting disc 11 comprises an outer helical toothing or worm toothing 14 engaging a rotatingly drivable worm 15. By means of said worm 15, the setting disc 11 can be rotated by a small angular amount relative to the housing 30 in which the shaft (not illustrated) and the worm 15 are supported. At a short axial distance from the setting disc 11, there is positioned a pressure disc 17 in the housing 30, which pressure disc 17 rests axially against an axial bearing 18 by means of which it is able to act on a multi-plate coupling. A further pressure disc can be arranged between the multi-plate coupling and the axial bearing 18. The outer circumference of the pressure disc 17 is provided with notches 19 which can be engaged by anti-rotation means firmly connected to the housing 30.

In the end face 21 of the setting disc 11 and in the end face 27 of the pressure disc 17—said end faces facing one another—there are provided ball groove configurations 22, 28 with oppositely directed gradients, which jointly accommodate a ball 23. At least two ball groove configurations 22, 28 and ball 23 are distributed around the circumference Said ball groove configurations support the pressure disc 17 both radially and axially relative to the setting disc 11. In at least one of the discs the ball groove configurations change the depth of same across the circumference of same, so that rotating the setting disc 11 leads to an axial displacement of the pressure disc 17 to the extent that the latter is held by the anti-rotational means in the direction of rotation.

The worm 15 is positioned on the shaft 24 of an electric motor 25 which is firmly arranged in the housing 30. The worm drive 14, 15 is self-inhibiting so that, when the electric motor 25 is de-energized, the rotational position of the setting disc 11 is secured. The unlockable anti-rotation means are formed by a pin 20 which is aligned radially relative to the shaft axis and which, by means of an electromagnet 26, is held in the position of engagement in one of the notches 19. The electromagnet 26 is also firmly arranged in the housing 30. When the electromagnet 26 is de-energized, the pin 20 can be pushed radially outwardly into the released position by a pressure springs which frees the pin and enables same to engage in on of the notches 19. As a result, the pressure disc 17 becomes freely rotatable and, under the return influence of axial forces coming from the multi-plate coupling and by means of the ball groove configurations 22, 28 and the balls 23, the pressure disc 17 is able to return into a rotational position in which it is made to axially approach the setting disc 11, as a result of which the setting path of the device is clearly reduced. At its front end, the pin 20 is conical or, if it is rotationally secured, it is wedge-shaped and cooperates with the flanks of the notch 19. The flanks of the notch 19 form an angle relative to the radial line which is large enough to prevent any self-inhibition between the pin and flanks to become effective. As soon as, due to axial forces acting on the pressure disc 17, rotational forces act on the pressure disc 17, the flanks push the pin automatically into its released position, thus permitting rapid release and safety switching, and the axial setting forces of the setting device can be reduced rapidly and the setting distance can be reduced rapidly.

Figure 2:
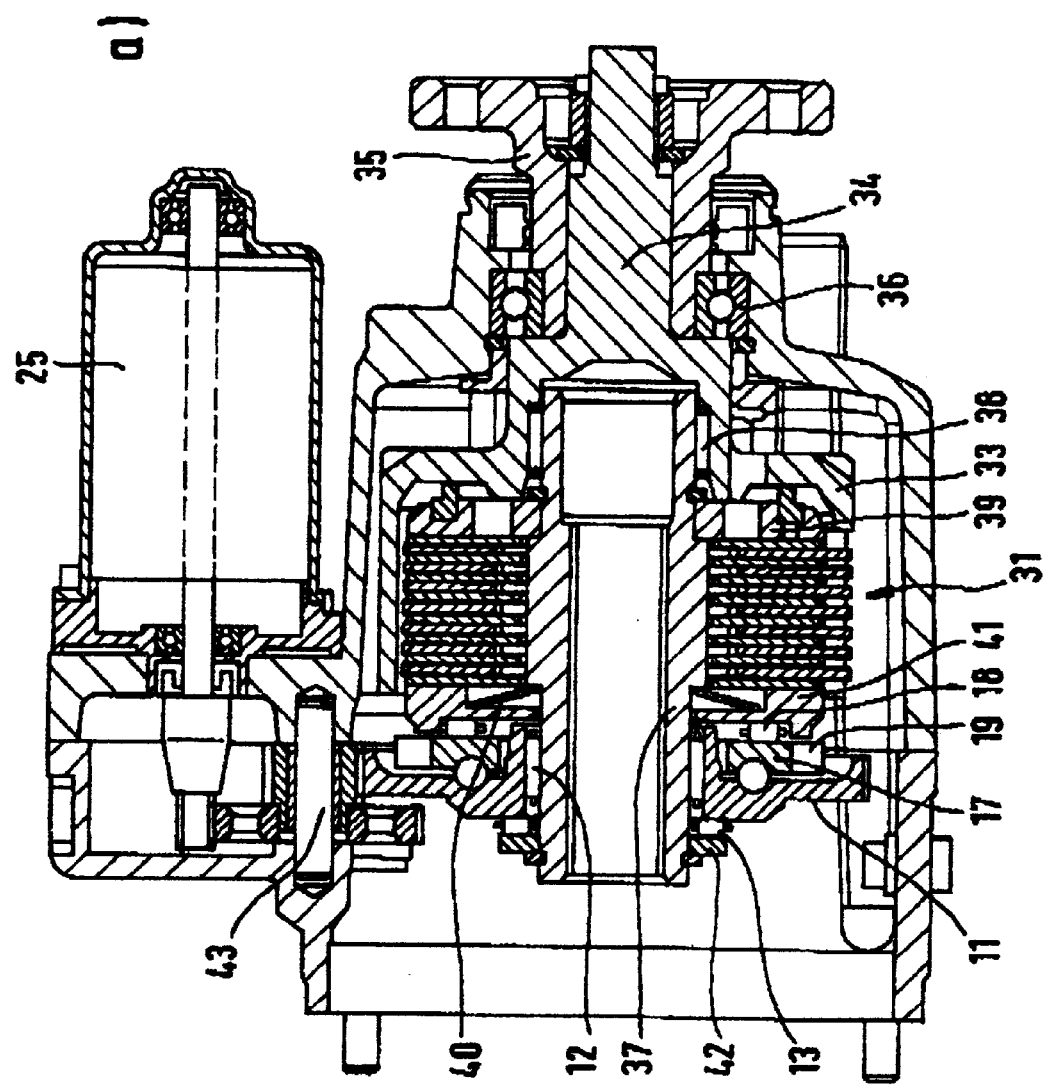
FIG. 2 shows a setting assembly in accordance with the invention (a) in connection with a friction coupling in a longitudinal section through the housing, (b) in another embodiment in axial section.

FIG. 2a) shows an inventive axial setting device cooperating with a friction coupling 31. The friction coupling is arranged in a housing 30 and comprises a coupling carrier 33 which is supported in the housing 30 by a shaft 34, and a shaft flange. For supporting purposes, there is provided a rolling contact bearing 36. Furthermore, the coupling comprises a shaft 37 which is supported directly in the shaft journal 34. In this case, there is provided a needle bearing 38 for supporting purposes. One part of the coupling plates is connected to the coupling carrier 33 and another part of the coupling plates is connected to the shaft 37. At one end, the coupling plate package is delimited by a supporting disc 39 and at the other end by a pressure disc 41. The pressure disc 41 is acted upon by a plate spring 40 which is supported on the shaft 37 and applies returning forces to the setting device. The setting device can be seen to be provided with an axial bearing 18, the pressure disc 17 with notches 19, the setting disc 11, the radial bearing 12 and the further axial bearing 13, with the geometry of said parts being only slightly modified as compared to the setting device according to FIG. 1. The axial bearing 13 is supported by a disc 42 on the shaft 37. In this embodiment, the pressure disc 17 is rotationally secured through the notches 19 against rotation relative to the housing 30 by means which are not illustrated The setting disc 11 is rotationally driven via a reduction gear 43 by an electric motor 25. in this embodiment, the axial adjustment of the pressure disc 11 in both directions of the setting path is effected entirely compulsorily by the electric motor 25.

In FIG. 2*b*) a setting device different from that in FIG. 2*a*) comprises a setting disc 11', which is rotatably drivable via straight gears 14' through a straight gear pinion 15', and a pressure disc 17' being axially supported on an axial bearing 13 and held against rotation relative to the housing through notches 19' by means 26' which are not completely illustrated. These means are releasable from the notches so that the pressure disc may freely rotate and the pressure disc 17' may return in axial movement without being driven by the straight gear pinion 15.

I claim:

1. An axial setting device for actuating a multi-plate coupling whose friction plates are alternately connected in a rotationally fast and axially displaceable way to the one and the other respectively of two parts rotatable relative to one another, which rest against an axially fixed supporting disc and which can be loaded by an axially displaceable pressure disc, comprising a housing, a setting disc rotatably supported in said housing and mounted so as to be axially fixed and rotatingly drivable in said housing, said pressure disc supported in said housing in a rotationally fast way by anti-rotation means arranged in said housing and which is axially displaceable in said housing, ball groove configurations in the surfaces of said setting disc and of said pressure disc, which surfaces face one another said ball groove configurations extending in the circumferential direction and having oppositely directed gradients across the circumference and are associated with one another in pairs, so as to jointly accommodate a ball, and rotary driving means for said setting disc mounted in said housing, and wherein said anti-rotation means is designed so as to be releasable from said pressure disc.

2. An axial setting device according to claim 1, wherein said anti-rotation means comprise an axially displaceable pin which is aligned radially relative to said pressure disc, which, in a first position, can engage notches in the circumference of said pressure disc and which, in a second position, is able to move radially out of said notches.

3. An axial setting device according to claim 2, wherein said anti-rotation means comprises an electro-magnet which, when being excited, acts on said displaceable pin, so as to hold same in the first position.

4. An axial setting device according to claim 2, wherein at said circumference of said pressure disc, the free end of said displaceable pin and the flanks of said notches form angles with the radial direction which are greater than the self-inhibition angle.

5. An axial setting device according to claim 3, wherein at said circumference of said pressure disc, the free end of said displaceable pin and the flanks of said notches form angles with the radial direction which are greater than the self-inhibition angle.

6. An axial setting device according to claims 1, wherein a pretension pressure plate spring, acts axially on said axially displaceable pressure disc towards said axially fixed disc.

7. An axial setting device according to claim 2, wherein a pretension pressure plate spring, acts axially on said axially displaceable pressure disc towards said axially fixed disc.

8. An axial device according to claim 3, wherein a pretension pressure plate spring, acts axially on said axially displaceable pressure disc towards said axially fixed disc.

9. An axial setting device according to claim 4, wherein a pretension pressure plate spring, acts axially on said axially displaceable pressure disc towards said axially fixed disc.

10. An axial setting device according to claim 5, wherein a pretension pressure plate spring, acts axially on said axially displaceable pressure disc towards said axially fixed disc.

11. An axial setting device according to claims 1, wherein said outer circumference of said setting disc is provided with toothing and that there is provided a setting motor on whose shaft there is positioned a worm which engages said toothing.

12. An axial setting device according to claim 2, wherein said outer circumference of said setting disc is provided with toothing and that there is provided a setting motor on whose shaft there is positioned a worm which engages said toothing.

13. An axial setting device according to claim 3, wherein said outer circumference of said setting disc is provided with toothing and that there is provided a setting motor on whose shaft there is positioned a worm which engages said toothing.

14. An axial setting device according to claim 4, wherein said outer circumference of said setting disc is provided with toothing and that there is provided a setting motor on whose shaft there is positioned a worm which engages said toothing.

15. An axial setting device according to claim 5, wherein said outer circumference of said setting disc is provided with toothing and that there is provided a setting motor on whose shaft there is positioned a worm which engages said toothing.

16. An axial setting device according to claim 6, wherein said outer circumference of said setting disc is provided with toothing and that there is provided a setting motor on whose shaft there is positioned a worm which engages said toothing.

17. An axial setting device according to claim 11, wherein a worm drive is provided consisting of said setting disc and said worm which is self-inhibiting.

18. An axial setting device according to claim 12, wherein a worm drive is provided consisting of said setting disc and said worm which is self-inhibiting.

19. An axial setting device according to claim 13, wherein a worm drive is provided consisting of said setting disc and said worm which is self-inhibiting.

20. An axial setting device according to claim 14, wherein a worm drive is provided consisting of said setting disc and said worm which is self-inhibiting.

21. An axial setting device according to claim 15, wherein a worm drive is provided consisting of said setting disc and said worm which is self-inhibiting.

22. An axial setting device according to claim 16, wherein a worm drive is provided consisting of said setting disc and said worm which is self-inhibiting.

23. An axial setting device according to claim 2, wherein said outer circumference of the setting disc is provided with spur gear toothing and there is provided a setting motor on which shaft there is positioned a spur gear pinion for engagement with said spur gear toothing.

24. An axial setting device according to claim 3, wherein said outer circumference of the setting disc is provided with spur gear toothing and there is provided a setting motor on which shaft there is positioned a spur gear pinion for engagement with said spur gear toothing.

25. An axial setting device according to claim 4, wherein said outer circumference of the setting disc is provided with spur gear toothing and there is provided a setting motor on which shaft there is positioned a spur gear pinion for engagement with said spur gear toothing.

26. An axial setting device according to claim 5, wherein said outer circumference of the setting disc is provided with spur gear toothing and there is provided a setting motor on which shaft there is positioned a spur gear pinion for engagement with said spur gear toothing.

* * * * *